Figure 2:
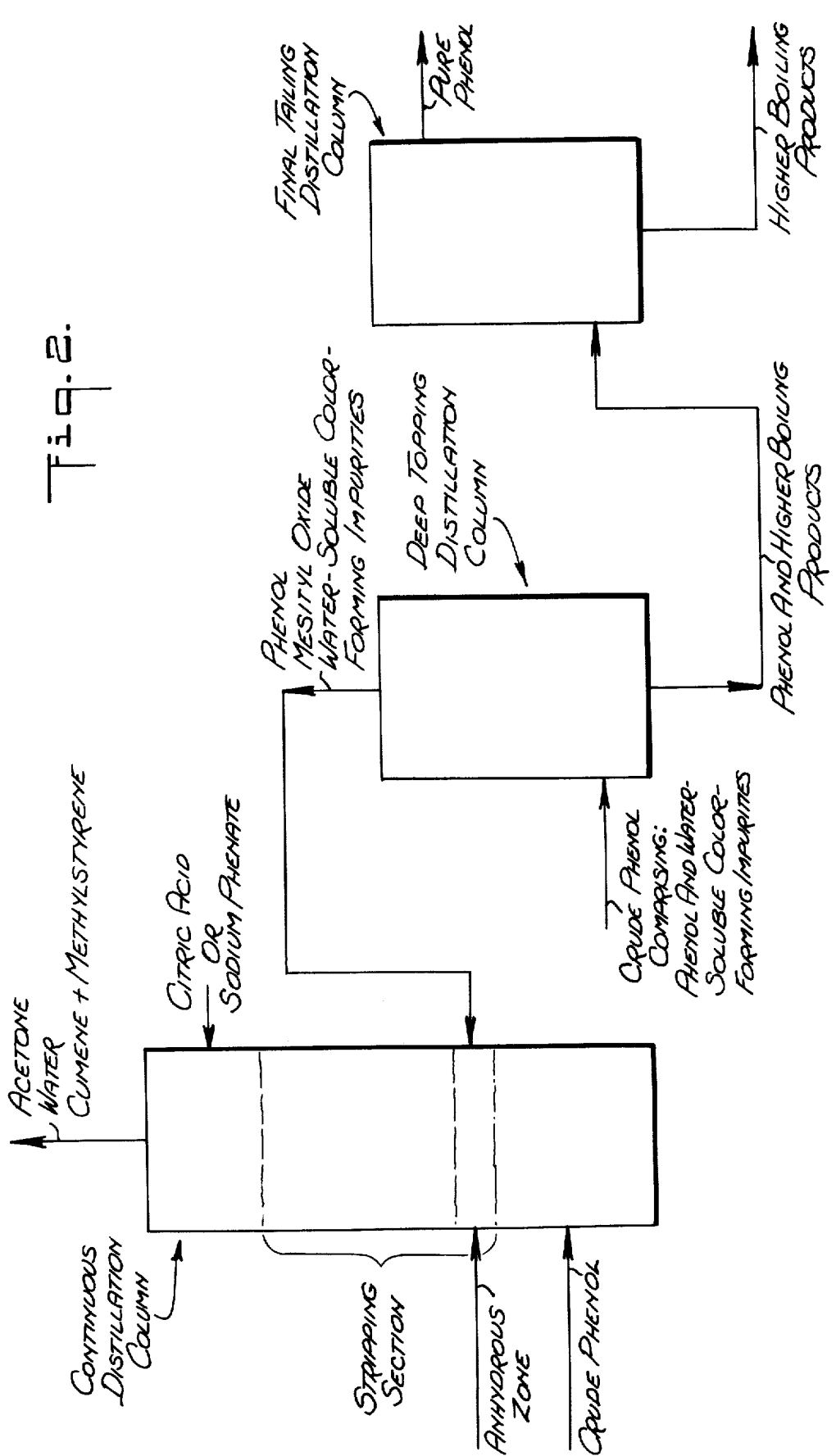

United States Patent [19]

Cooke

[11] 3,896,006

[45] July 22, 1975

[54] MESITYL OXIDE REMOVAL FROM HIGH-PURITY PHENOL

[75] Inventor: Maurice Dudley Cooke, East Horsley, England

[73] Assignee: BP Chemicals International Limited, London, England

[22] Filed: May 8, 1974

[21] Appl. No.: 468,147

Related U.S. Application Data

[63] Continuation-in-part of Ser. No. 360,975, May 16, 1973, abandoned.

[30] Foreign Application Priority Data

June 1, 1972 United Kingdom............... 25598/72

[52] U.S. Cl. ............... 203/28; 203/71; 260/621 A; 260/621 C; 260/593 R
[51] Int. Cl. ..................................... B01d 3/34
[58] Field of Search....... 260/621 A, 621 C; 203/28, 203/71, 73, 80, 81, 96, 84

[56] References Cited
UNITED STATES PATENTS

| 2,728,793 | 12/1955 | Armstrong et al. | 260/621 A |
| 2,824,049 | 2/1958 | Maincon et al. | 260/621 A |
| 2,971,893 | 2/1961 | Hood | 203/49 |
| 2,986,583 | 5/1961 | Robbers et al. | 260/621 C |
| 3,029,294 | 4/1962 | Keeble | 260/621 A |
| 3,180,897 | 4/1965 | Sodomann et al. | 260/621 A |
| 3,365,375 | 1/1968 | Nixon | 260/621 C |

FOREIGN PATENTS OR APPLICATIONS

| 768,715 | 2/1957 | United Kingdom | 260/621 A |
| 970,945 | 9/1964 | United Kingdom | 260/621 A |

Primary Examiner—Norman Yudkoff
Assistant Examiner—Frank Sever
Attorney, Agent, or Firm—Brooks Haidt Haffner & Delahunty

[57] ABSTRACT

A process for the purification of phenol obtained from the acid cleavage of cumene hydroperoxide and consisting essentially of phenol and less than 1,000 parts per million of water-soluble colour forming impurities boiling from 152° to 182° by subjecting the phenol to a fractional distillation such that the impurities are retained within the column under distillation conditions for a period so as to concentrate them and at least partially to decompose them to mesityl oxide, removing a base product comprising phenol free from the water-soluble colour forming impurities boiling from 152° to 182° and an overhead fraction containing mesityl oxide and thereafter separating the phenol free from the higher boiling decomposition products.

The purification is effected in a distillation column distilling crude phenol or other column with overhead take-off provided with an enlarged stripping section or by deep-topping of purified phenol or by removing a phenolic sidestream from a phenol dehydration column.

14 Claims, 3 Drawing Figures

Fig. 1.

```
                                    ┌──────────────────────┐
                                    │                      │──→ PURE PHENOL
                         FINAL TAILING DISTILLATION COLUMN  │
                                    │                      │
                                    │                      │──→ HIGHER BOILING PRODUCTS
                                    └──────────────────────┘
                                              ↑
                                              │ PHENOL AND HIGHER BOILING PRODUCTS
   ACETONE                                    │
   CUMENE + METHYLSTYRENE ←──┐                │
   MESITYL OXIDE             │                │
                   ┌─────────┴────────────────┴──┐
                   │                             │
   CONTINUOUS      │   ENLARGED STRIPPING        │
   DISTILLATION    │        SECTION              │
   COLUMN          │                             │
                   └─────────────────────────────┘
                                 ↑
            CRUDE PHENOL COMPRISING:
            PHENOL
            WATER
            ACETONE
            CUMENE AND METHYLSTYRENE
            WATER-SOLUBLE, COLOR-FORMING IMPURITIES
```

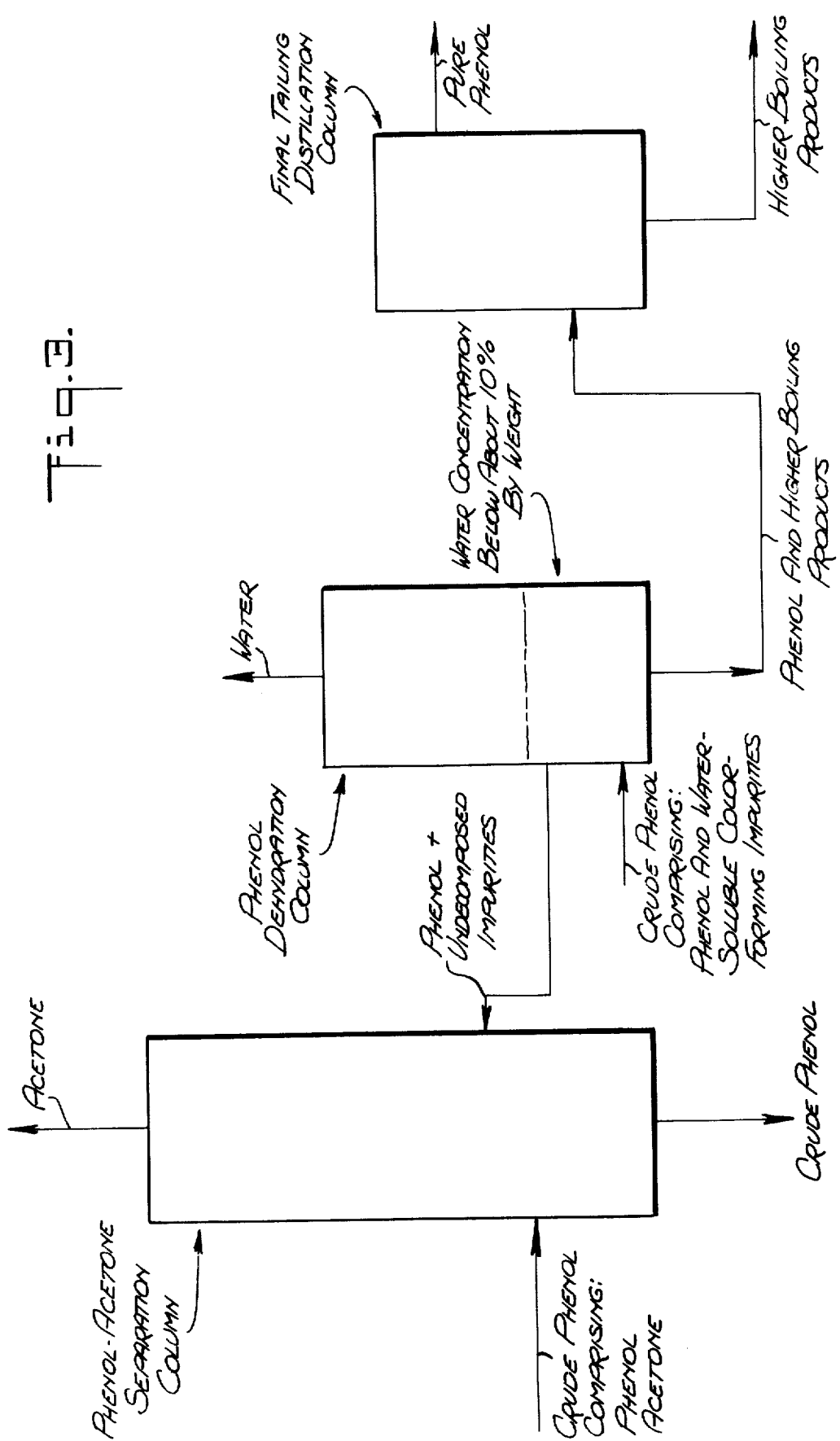

MESITYL OXIDE REMOVAL FROM HIGH-PURITY PHENOL

This Application relates to an invention which is a process for improving the purity of phenol produced by the decomposition of cumene hydroperoxide, and is a continuation-in-part Application of my Application Ser. No. 360,975 filed May 16, 1973 now abandoned.

The production of phenol by the oxidation of cumene and cleavage of the resulting hydroperoxide in the presence of an acidic catalyst is well known. The cleavage product contains phenol and acetone as the principal products, together with minor amounts of by-products. Fractional distillation of the product results in phenol of sufficient purity for most purposes. However, the production of certain products, e.g. diphenylol propane and polycarbonates has created a demand for phenol of exceptionally high purity.

Generally, the purity of phenol is determined in colour tests based on sulphonation and chlorination of phenol, which tests are exceptionally sensitive to colour forming impurities. A very pure phenol is one which develops practically no colour in these tests. Whilst the purification of phenol has generally entailed successive fractional distillation steps, it has always been necessary to include a special step to remove the colour-forming impurities. Treatments which have been used include treatment with a solid condensing agent, such as silica/alumina or ion exchange resins. Such treatments have never been entirely satisfactory because of expense, difficulty of regeneration and incomplete removal of impurities.

It has now been found that the colour-forming impurities as well as other impurities detectable by gas chromatography can be removed from phenol by distillation under certain conditions to give a final phenol product which meets the most stringent tests for sulphonation and chlorination colour.

Thus accodring to the present invention there is provided a process for the purification of phenol obtained from the acid cleavage of cumene hydroperoxide and consisting essentially of phenol and less than 1,000 parts per million of water-soluble colour-forming impurities boiling from 152° to 182°C which comprises subjecting the phenol, to a fractional distillation such that the water-soluble colour-forming impurities are retained within a section of the column under distillation conditions for a period so as to concentrate the impurities and at least partially to decompose them to mesityl oxide, removing a base product comprising phenol free from water-soluble colour-forming impurities boiling from 152° to 182°C and an overhead fraction containing mesityl oxide, and thereafter separating the phenol from high boiling decomposition products.

FIG. 1 shows a first embodiment of the invention.
FIG. 2 shows a second embodiment of the invention.
FIG. 3 shows a third embodiment of the invention.

In a preferred embodiment of the invention illustrated schematically in FIG. 1, the distillation of the phenol containing water-soluble colour-forming impurities boiling from 152° to 182°C to concentrate and decompose the impurities may be effected simultaneously in an anhydrous part of a continuously operated distillation column distilling crude phenol, or other column with over-head take-off, provided with an enlarged stripping section to provide for an increased residence time in the column. By distillation column with enlarged stripping section within the context of the present application is meant a column incorporating a stripping section provided with more plates than are required to perform its normal function. Thus in a continuously operated column separating phenol from acetone, water, cumene, mesityl oxide and methyl styrene the stripping section of the column containing say 20 plates normally is provided with extra plates e.g. about 25 plates over and above those necessary to achieve the aforementioned separation. The feed to this column may be, for example, the washed cleavage product and may contain acetone, water mesityl oxide, cumene and methyl styrene. In the column these components are removed in the overhead fraction leaving mainly phenol and higher-boiling cleavage products, containing water-soluble colour-forming impurities boiling from 152° to 182°C, in an anhydrous part of the column. Phenol, free from water-soluble colour-forming impurities boiling from 152° to 182°C is recovered from the base of the column and is further purified by removal of higher-boiling impurities such as para- and ortho-cumyl phenol, x-methyl styrene dimers, acetophenone and tars.

In a second preferred embodiment of the invention illustrated schematically in FIG. 2, the water-soluble colour-forming impurities boiling from 152° to 182°C are eliminated by carrying out a deep-topping distillation of a phenol-containing fraction from which water, acetone, mesityl oxide, cumene methyl styrene and higher boiling cleavage products have already been removed. By deep-topping distillation is meant a distillation step in which purified phenol containing only higher-boiling decomposition products are removed as base products, and the water-soluble colour-forming impurities boiling from 152° to 182°C under normal pressure and mesityl oxide, together with a substantial quantity of phenol, are removed as an overhead fraction. In this deep-topping distillation the phenol which has been freed from acetone, water, mesityl oxide, cumene methyl styrene and higher boiling cleavage products is subjected to a distillation under such conditions throughout the column that the water-soluble colour-forming impurities are retained within the column under distillation conditions for a period so as to concentrate the impurities and at least partially to decompose them to mesityl oxide. This step may be introduced at any suitable point of the conventional distillation sequence. The precise amount of phenol removed in the overhead fraction will depend upon the parameter of the particular column employed. Thus with a column having 15 stripping trays and 10 rectifying trays, and with a reflux to feed ratio of about 2, a maximum of about 10% by weight of the feed phenol is removed as distillate. Suitable points include a step immediately after the distillation separating crude acetone from crude phenol, or just before the final tailing distillation of the phenol or immediately before or after the distillation separating phenol from high boiling cleavage products, the choice of location depending on the economics of the particular sequence under consideration. The impurities contained in the phenol and mesityl oxide arising from the decompositions are concentrated in the overhead fraction, whilst phenol, free from water-soluble colour-forming impurities boiling from 152° to 182°C, is recovered from the base and purified by removal of higher-boiling impurities.

In order to decompose the impurities contained in the overhead fraction from the deep-topping distillation step and recover the phenol contained therein, it is preferred to recycle to the process the overhead fraction in such a manner that undesirable impurities do not build up in concentration. This may suitably be achieved by recycling the overhead fraction to a point in the distillation sequence at which impurities will tend to be concentrated under conditions of relatively high temperature and in the absence of water. Under these conditions, the colour-forming impurities condense or decompose to mesityl oxide which may be removed without difficulty, and thus does not indefinitely accumulate in a continuously operated process, i.e. it reaches a "stationary" concentration in which the rate of decomposition equals the rate at which the impurities enter the system. A very convenient point in the distillation sequence at which the overhead fraction from the deep-topping distillation step may be introduced is the continuously operated column separating phenol from acetone, water, cumene, mesityl oxide, and methyl styrene and having an anhydrous zone in the stripping section, below the feed point. It is advantageous further to introduce an acid, e.g. citric acid, or an alkali, e.g. sodium phenate, to catalyse the decomposition of the impurities contained in the overhead fraction from the deep-topping distillation step. Alternatively, the overhead fraction may be removed as a low-grade phenol product and used as such.

Alternatively as illustrated schematically in FIG. 3, or in addition to the two embodiments of the invention hereinbefore described, the water-soluble colour-forming impurities boiling from 152° to 182°C may be eliminated in a phenol dehydration column by maintaining them within an anhydrous part of the column for a period so as to concentrate the impurities and at least partially to decompose them to mesityl oxide and removing a phenolic sidestream containing undecomposed impurities at a point where the water concentration is below about 10%. Phenol free from water-soluble colour-forming impurities but containing higher-boiling decomposition products is removed from the base of the column and thereafter further purified by removal of the higher-boiling compounds. Mesityl oxide is removed overhead. The sidestream may be recycled to the continuously operated column separating phenol from acetone, water, cumene, mesityl oxide and methyl styrene for further decomposition of the impurities and the anhydrous zone of the stripping section of the column. Removal of a phenolic sidestream advantageously removes also, other impurities such as organic acids, e.g. formic and acetic acids.

The base product comprising phenol free from water-soluble colour-forming impurities boiling from 152° to 182°C may be removed as a side stream from the distillation column and may be removed either as a liquid or a vapour.

The type of impurities removed from the phenol in the process of the invention are those which have a relative volatility too close to that of phenol to be removed in a distillation column separating mesityl oxide, cumene and methyl styrene from phenol under anhydrous conditions and too soluble in water to be removed by hydroextractive distillation. Such compounds include diacetone alcohol and many carbonyls, particularly α-dicarbonyl and α-hydroxy-carbonyl compounds and others of unknown structure, all of which are bad colour formers in the chlorination and sulphonation tests.

The following example illustrates the invention. In the example, the following procedures were used for the sulphonation and chlorination colour tests:

THE SULPHONATION TEST

A 20 ml portion of molten phenol is pipetted into one limb of a cruciform reaction vessel and held for 10 minutes at 45°C, then 20 ml of analytical reagent grade concentrated sulphuric acid is pipetted into another limb and the reaction vessel is evacuated. The two liquids are rapidly mixed by pouring backwards and forwards between the two limbs and allowing the temperature to rise spontaneously. After 4 minutes, the vacuum is released and the mixture is slowly stirred for 1 minute to assist the escape of air bubbles. Stirring is continued for 5 minutes in a cooling bath at 20°C. The mixture is transferred to a 20 mm spectroscopic cell and the optical density measured against water at 532 nm. Results are expressed in per cent transmission.

THE CHLORINATION TEST

A 10 g sample of phenol is weighed into an absorber tube and heated to 45°C. Chlorine gas is introduced until 3.6 g. of chlorine have been absorbed. The optical density of the solution is measured using a 10 mm cell against cyclohexane at wavelengths from 550 to 490 nm in steps of 5 nm. The result is reported as optical density at the maximum, giving the wavelength of the maximum.

EXAMPLE

A purified anhydrous phenol, derived from the acid cleavage of cumene hydroperoxide freed from higher boiling decomposition products such as p- and o- cumyl phenol, α-methyl styrene dimers, acetophenone and tars and freed from mesityl oxide, cumene, methyl benzofuran and methyl styrene by conventional hydroextractive distillation followed by dehydration and free also from hydroxyacetone, cumyl phenol, α-methyl styrene dimers, acetophenone and tars, but containing trace quantities of freely water-soluble colour-forming impurities boiling close to phenol, was split into two portions (a) and (b); portion (a) was submitted directly to a conventional topping and tailing distillation wherein the feed is introduced to the fifth tray from the case of a continuously operated 30 tray column under sub-atmospheric pressure and fitted with a reboiler at the base, product phenol boiling at about 150°C is removed as a sidestream liquid 25 trays from the base, the sidestream take-off being surmounted by a pasteurising section of five trays operating under nearly total reflux, there being purged from the distillate a maximum of about 5% (based on the feed phenol) of phenol and residual traces of low-boiling impurities which are re-cycled for recovery of the phenol therefrom. From the base of the column phenol and residual traces of high-boiling impurities boiling at about 160°C are removed by another purge stream and re-cycled for recovery of the phenol content.

The feed to the column is about 13,000 kg./hr.; the liquid product removed from tray 25 amounts to 12,000 kg./hr.; 34,000 kg./hr. of vapour is removed from the top of the column, condensed and returned as reflux from which a purge of about 500 kg./hr. is re-cycled for phenol recovery and a purge of about 500 kg./hr. is removed from the bottom of the column and re-cycled for recovery of the phenol.

The other portion, portion (b), was subjected to a deep-topping distillation by feeding to a continuously operating column, consisting of 20 stripping plates and five rectifying plates, operating at atmosphere pressure and at a reflux of 20:1, and an overhead take-off of 10% of the feed, and the base product boiling about 190°C from this operation was then submitted to the same conventional topping and tailing distillation as the first portion to give a final product phenol distillate of improved properties. The purge from the topping column boiling about 180°C was re-cycled to the conventional continuously operated distillation column separating acetone, water, cumene, methyl styrene, and mesityl oxide from phenol and cleavage product high-boilers with anhydrous conditions in the stripping zone, i.e. below the feed point.

|  | Sulphonation Colour % Transmission at 532 nm | Chlorination Colour Optical Density at 495 nm |
|---|---|---|
| Final product phenol obtained without deep-topping distillation | 88 | 0.78 |
| Final product phenol obtained with deep-topping distillation | 96.5 | 0.13 |

The results show that phenol of high purity is obtained when already purified phenol which has been freed from acetone, water, mesityl oxide, cumene and methyl styrene and high boiling cleavage products is subjected, in addition to a conventional tailing distillation, to a deep-topping distillation in which the water-soluble colour-forming impurities are retained within the column under distillation conditions for a period so as to concentrate the impurities and at least partially to decompose them to mesityl-oxide, the residual impurities and mesityl oxide being removed in the overhead fraction. Continuous operation over several months caused no deterioration in the purity of the product phenol, showing that the said water-soluble colour-forming impurities, re-cycled with the purged distillate from the phenol deep-topping column, did not indefinitely accumulate.

I claim:

1. A process for the purification of crude phenol obtained from the acid cleavage of cumene hydroperoxide which comprises subjecting a feed of crude phenol consisting essentially of phenol and less than 1,000 parts per million of water-soluble color-forming impurities boiling from 152° to 182°C. to a fractional distillation such that the water-soluble color-forming impurities are retained within a section of the column under distillation conditions so as to concentrate said impurities and at least partially to decompose said impurities to mesityl oxide, removing a base product comprising phenol free from water-soluble color-forming impurities boiling from 152° to 182°C. and an overhead fraction containing mesityl oxide, and thereafter distilling the phenol from the higher-boiling decomposition products.

2. A process according to claim 1, wherein said distillation to concentrate and decompose said impurities is effected in an anhydrous part of an enlarged stripping section of a distillation column having an overhead take-off, said enlarged stripping section providing for an increased residence time of said impurities in said column.

3. A process according to claim 2 wherein: (a) the feed to said distillation column contains acetone, water, mesityl oxide, cumene and methyl styrene, and high boiling cleavage products; (b) water, acetone, and some hydrocarbon and mesityl oxide is removed in the overhead fraction; and (c) phenol, said impurities, and higher boiling cleavage products are in an anhydrous part of said column.

4. A process for the purification of crude phenol obtained from the acid cleavage of cumene hydroperoxide which comprises subjecting a feed consisting essentially of phenol and less than 1,000 parts per million of water-soluble color-forming impurities boilingg from 152° to 182°C., said crude phenol being free from acetone, water, mesityl oxide, cumene and methyl styrene, to a fractional distillation such that the water-soluble impurities are retained within a section of the column under distillation conditions so as to concentrate said impurities and at least partially to decompose them to mesityl oxide, removing a base product comprising phenol free from said impurities and higher boiling products and an overhead fraction containing some phenol, mesityl oxide, and water-soluble color-forming impurities, and thereafter distilling the base phenol from the higher boiling products.

5. A process according to claim 4 wherein said distillation is effected just after the crude phenol distillation separating phenol from higher boiling distillation products.

6. A process according to claim 4 wherein said distillation is carried out just before final recovery of phenol as a distillate from higher boiling products.

7. A process according to claim 4 wherein said overhead fraction comprising some phenol, mesityl oxide, and said impurities is recycled to a point in the overall distillation sequence for the recovery of phenol from the acid cleavage of cumene hydroperoxide at which impurities tend to be concentrated under conditions of temperature above the temperature at which at least partial decomposition of said impurities to mesityl oxide occurs under anhydrouus conditions.

8. A process according to claim 7 wherein the overhead fraction is re-cycled to the stripping section of a continuously operated column separating phenol from acetone, water, cumene, mesityl oxide and methyl styrene and having an anhydrous zone in the stripping section below the feed point.

9. A process according to claim 8 wherein citric acid is introduced into the column separating phenol from acetone, cumene, mesityl oxide and methyl styrene.

10. A process according to claim 8 wherein sodium phenate is introduced into the column separating phenol from acetone, cumene, mesityl oxide and methyl styrene.

11. A process according to claim 4 wherein said fractional distillation is carried out immediately after distillation separating crude acetone from crude phenol.

12. A process for the purification of a crude phenol obtained from the acid cleavage of cumene hydroperoxide which comprises subjecting a feed of crude phenol consisting essentially of phenol and less than 1,000 parts per million of water-soluble color-forming impurities boiling from 152° to 182°C. to a fractional distillation such that the water-soluble color-forming impurities are maintained within a water-free section of a phenol dehydration column so as to concentrate the impurities and at least partially to decompose said impurities to mesityl oxide, removing a phenolic sidestream containing residual impurities at a point in said column where the water content is below about 10% by weight, removing a base product comprising phenol free from water-soluble color-formingg impurities boiling from 152° to 182°C. and an overhead fraction containing mesityl oxide, and thereafter separating the phenol from the higher-boiling decomposition products.

13. A process according to claim 12 wherein the phenolic sidestream is re-cycled to the stripping section of continuously operated column separating phenol from acetone, water, cumene, mesityl oxide and methyl styrene for further decomposition of the impurities in the anhydrous zone of the stripping section of the column.

14. A process according to claim 12 wherein the base product comprising phenol free from water-soluble colour-forming impurities boiling from 152° to 182°C is removed as a sidestream from the distillation column.

* * * * *